United States Patent
Telford et al.

(10) Patent No.: US 9,700,152 B2
(45) Date of Patent: Jul. 11, 2017

(54) HIP SEAT DEVICE AND SYSTEM

(71) Applicant: The ERGO Baby Carrier, Inc., Los Angeles, CA (US)

(72) Inventors: Rodney V. Telford, Kula, HI (US); Joseph Hei, Palo Alto, CA (US)

(73) Assignee: The ERGO Baby Carrier, Inc., Los Angeles, CA (US)

( * ) Notice: Subject to any disclaimer, the term of this patent is extended or adjusted under 35 U.S.C. 154(b) by 0 days.

(21) Appl. No.: 15/087,628

(22) Filed: Mar. 31, 2016

(65) Prior Publication Data
US 2016/0286980 A1  Oct. 6, 2016

Related U.S. Application Data

(60) Provisional application No. 62/140,994, filed on Mar. 31, 2015.

(51) Int. Cl.
  *A47D 13/02* (2006.01)
  *A47D 15/00* (2006.01)
  *F16M 13/04* (2006.01)

(52) U.S. Cl.
  CPC ......... *A47D 13/025* (2013.01); *A47D 15/006* (2013.01); *F16M 13/04* (2013.01)

(58) Field of Classification Search
  CPC .... A47D 13/02; A47D 13/025; A47D 15/006; B60N 2/26; F16M 13/04
  USPC ................................................. 224/158–161
  See application file for complete search history.

(56) References Cited

U.S. PATENT DOCUMENTS

| | | | |
|---|---|---|---|
| 2,973,889 A | 3/1961 | Phillips |
| 3,327,914 A | 6/1967 | Abram |
| 4,009,808 A | 3/1977 | Sharp |
| 4,234,229 A | 11/1980 | Arnold |
| 4,469,259 A | 9/1984 | Krich et al. |
| 4,579,264 A | 4/1986 | Napolitano |
| 4,651,366 A | 3/1987 | Lande et al. |
| 4,724,988 A | 2/1988 | Tucker |
| 4,901,898 A | 2/1990 | Colombo |

(Continued)

FOREIGN PATENT DOCUMENTS

| CA | 2357614 | 3/2002 |
|---|---|---|
| GB | 2314026 | 12/1987 |

(Continued)

OTHER PUBLICATIONS

International Search Report and Written Opinion issued for PCT Application No. PCT/US2016/025261, mailed Jun. 27, 2016, 8 pages.

(Continued)

*Primary Examiner* — Corey Skurdal
(74) *Attorney, Agent, or Firm* — Sprinkle IP Law Group

(57) ABSTRACT

Embodiments disclosed herein provide hip seat devices and systems for carrying a child in a position that is ergonomically beneficial for the child and comfortable for the wearer. A hip seat device may comprise a seating platform attached to a wearer engagement surface. The wearer engagement surface is held against the body of a wearer, such as by a waist belt encircling the wearer. The seating platform has a bucket shape for promoting a child seated thereon to assume an ergonomic spread-squat position ("M" position). The bucket shape may have the additional benefit of bringing the child closer to the wearer, reducing the moment on the carrier and thus the resulting force on the wearer.

21 Claims, 10 Drawing Sheets

(56) References Cited

U.S. PATENT DOCUMENTS

| | | | |
|---|---|---|---|
| 4,986,458 | A | 1/1991 | Linday |
| 5,071,047 | A | 12/1991 | Cordisco |
| 5,129,406 | A | 7/1992 | Magnusen et al. |
| 5,178,309 | A | 1/1993 | Bicheler |
| 5,224,229 | A | 7/1993 | Smith |
| 5,224,637 | A | 7/1993 | Colombo |
| 5,371,909 | A | 12/1994 | McCarty |
| 5,425,381 | A | 6/1995 | Peterson et al. |
| 5,492,256 | A | 2/1996 | Ive |
| 5,813,580 | A | 9/1998 | Fair |
| 5,826,287 | A | 10/1998 | Tandrup |
| 5,988,742 | A | 11/1999 | Stevens |
| 6,055,686 | A | 5/2000 | Knight |
| D441,967 | S | 5/2001 | Reithmeier |
| 6,394,543 | B1 | 5/2002 | Dunne et al. |
| 6,409,060 | B2 | 6/2002 | Donine |
| 6,415,969 | B1 | 7/2002 | Higuchi |
| 6,467,840 | B1 | 10/2002 | Verbovszky et al. |
| 6,715,651 | B2 | 4/2004 | Le Gal |
| 6,772,925 | B2 | 8/2004 | O'Hare |
| 7,168,600 | B2 | 1/2007 | Hwang |
| 7,322,498 | B2 | 1/2008 | Frost |
| 7,494,031 | B2 | 2/2009 | Kassai et al. |
| 7,886,946 | B2 | 2/2011 | Gray |
| 8,028,871 | B2 | 10/2011 | Gray |
| 8,272,546 | B2 | 9/2012 | Leistensnider |
| 8,650,663 | B2 | 2/2014 | Fair et al. |
| 8,726,437 | B2 | 5/2014 | Hardesty |
| 8,745,794 | B1 | 6/2014 | McDermott |
| 9,220,352 | B2 | 12/2015 | Frost |
| 2003/0106916 | A1 | 6/2003 | Boone |
| 2004/0149790 | A1 | 8/2004 | Kassai et al. |
| 2004/0217633 | A1 | 11/2004 | Kassai et al. |
| 2005/0045674 | A1 | 3/2005 | Rehbein |
| 2005/0155995 | A1 | 7/2005 | Lee |
| 2005/0242136 | A1 | 11/2005 | Moriguchi et al. |
| 2006/0130220 | A1 | 6/2006 | Morgan et al. |
| 2007/0029356 | A1 | 2/2007 | Moriguchi et al. |
| 2007/0138845 | A1 | 6/2007 | Gold et al. |
| 2008/0047987 | A1 | 2/2008 | Price |
| 2008/0209639 | A1 | 9/2008 | Lord |
| 2010/0072236 | A1 | 3/2010 | Parness et al. |
| 2010/0147910 | A1 | 6/2010 | Schachtner |
| 2011/0042429 | A1 | 2/2011 | Frost |
| 2016/0066704 | A1 | 3/2016 | Frost |

FOREIGN PATENT DOCUMENTS

| | | |
|---|---|---|
| JP | 09-099842 A | 4/1997 |
| JP | 2005-131146 A | 5/2005 |
| JP | 2005-185426 | 7/2005 |
| JP | 2006-231033 | 9/2006 |
| JP | 4170894 B2 | 8/2008 |
| KR | 20-2010-0010658 | 10/2010 |
| KR | 20-0462354 | 9/2012 |
| WO | WO 95/05952 A1 | 3/1995 |
| WO | WO 2012165840 A2 | 12/2012 |

OTHER PUBLICATIONS

Casas, Rochelle, "Choosing a Carrier," The Continuum Concept Letter, Issue 9, New Native, Inc., Watsonville, CA 95076, 2 pgs.

"Spread-Squat-Position," published Nov. 9, 2007, downloaded from http://www.ergobabycarrier.com/press/2007/11/spreadsquatposition.htm . . . and printed on Jul. 16, 2009, Ergobaby, Inc., 3 pgs.

"Studies, Opinions and Scientific Papers" published Jan. 26, 2006, downloaded from http://www.ergobabycarrier.com/press/2006/01/studies-opinions-and-scie . . . , printed on Jul. 16, 2009, Ergobaby, Inc., 3 pgs.

International Search Report and Written Opinion for PCT Application No. PCT/US2010/045886, completed, Sep. 27, 2010, mailed, Oct. 6, 2010, 8 pgs.

International Preliminary Report on Patentability for PCT Patent Application No. PCT/US2010/045886, mailed Mar. 1, 2012, 7 pgs.

Office Action for U.S. Appl. No. 12/544,093, mailed Mar. 20, 2012, 15 pgs.

Office Action for U.S. Appl. No. 12/544,093, mailed Dec. 3, 2012, 12 pgs.

Extended European Search Report for European Patent Application No. 10810544.6, mailed Apr. 23, 2013, 9 pgs.

Chinese Office Action for Chinese Patent Application No. 201080046673.0, mailed Oct. 25, 2013, 16 pgs.

Office Action for U.S. Appl. No. 12/544,093, mailed Mar. 26, 2014, 19 pgs.

Communication Under Rule 71(3) EPC (Notice of Allowance) for European Patent Application No. 10810544.6, mailed May 15, 2014, 27 pages.

Office Action for Chinese Patent Application No. 201080046673.0, mailed Aug. 14, 2014, 6 pages.

Office Action for Chinese Patent Application No. 201080046673.0. mailed Feb. 13, 2015, 3 pgs.

Office Action issued for U.S. Appl. No. 14/940,565, mailed Sep. 26, 2016, 21 pages.

Office Action issued for U.S. Appl. No. 14/940,565, mailed Apr. 5, 2017, 11 pages.

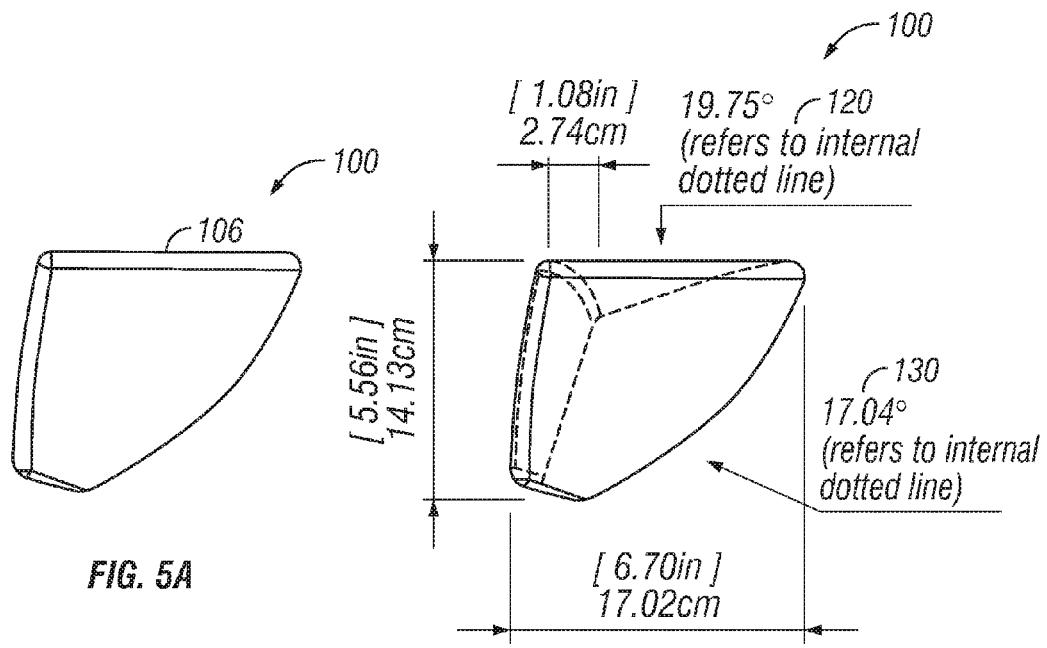
FIG. 5A
FIG. 5B
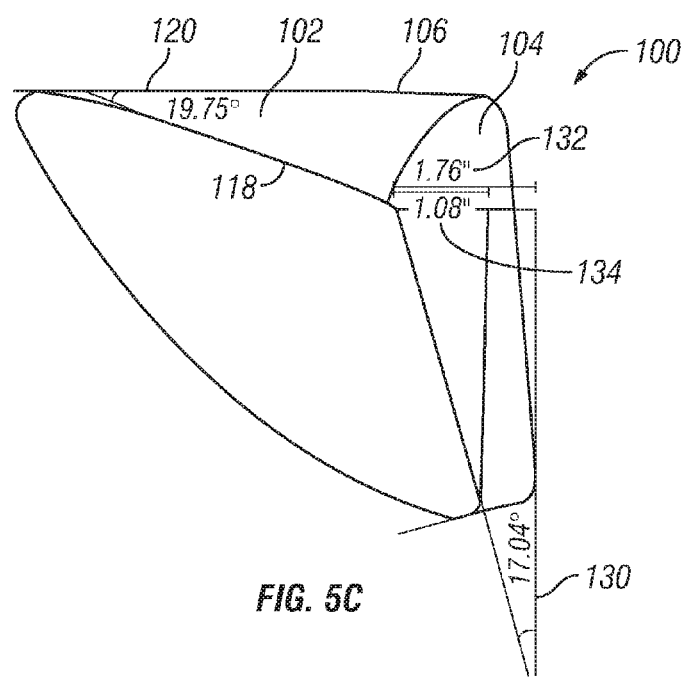
FIG. 5C

HIP SEAT DEVICE AND SYSTEM

RELATED APPLICATIONS

This application claims the benefit of priority under 35 USC §119 to U.S. Provisional Patent Application No. 62/140,994, entitled "HIP SEAT DEVICE AND SYSTEM" by Telford et al., filed Mar. 31, 2015, which is hereby fully incorporated by reference herein.

TECHNICAL FIELD

The disclosure relates to child carriers. More particularly, this disclosure relates to child carriers that provide a seating platform for the child. Even more specifically, this disclosure relates to child carriers having a seating platform shaped to position a child in an ergonomically beneficial position.

BACKGROUND

Wearable child carriers allow wearers (e.g., parents, caretakers) to carry children comfortably while maintaining freedom of hand and arm movement. These carriers also allow for improved ergonomics for the wearer as the carrier may reduce the tendency of the parent to shift the spine to help support the child on the hip.

Some currently available child carriers wrap around a wearer's waist and provide a seating surface to seat the child on. These types of carriers are generally referred to as hip seats. The seating surface is usually semi-circular or semi-elliptical and in the form of a horizontally planar shelf. The shape of these seating surfaces allows a child's legs to hang downward. Additionally, children often settle on the edge of the seat, increasing the bending moment of the seat, resulting in discomfort for the wearer. Further increasing the discomfort of the wearer the front edge of such seating surfaces that are proximate to the wearer are short and flat, creating discomfort for the wearer when a child is placed on the seating surface.

What is desired, therefore, are hip seats that promote an ergonomic positioning of a child while also being comfortable for the wearer.

SUMMARY

To those ends, among others, embodiments of hip seat devices and systems as disclosed herein provide a seating platform that has a contoured bucket shape (e.g., a shape wherein the seating platform slopes generally down away from the outer edge of the seating platform, becoming deeper toward the inside of the platform) that promotes an ergonomically beneficial position for a child seated thereon in either an inward or an outward facing orientation. Specifically, in certain embodiments the outer edge of the seating platform may be the highest point of the seating platform. For example, the seating surface may be generally sloped from a center axis of the seating surface to the outer edge of the seating surface or from a front edge of the seating surface proximate the wearer to the outer edge. Additionally, in certain embodiments, the outer edge of the seating platform may have a top surface that is planar or sloped.

Accordingly, in certain embodiments, as the outer edge of the seating surface is higher than at the center axis more thigh support may be provided to a child seated thereon while additionally serving to elevate the child's knees, promoting an ergonomically beneficial position for the child. A planar or sloped top surface of the outer edge may further promote such an ergonomically beneficial position. Moreover, because a low point of the seating surface may be proximate to the wearer (e.g., along an edge of the seating surface proximate the wearer) such a seating surface may seat or retain the child in a position close to the wearer, bringing the child's center of gravity close to the wearer. By positioning the child closer to the wearer embodiments may further promote an ergonomically beneficial position of the child by providing additional room to support the child's thighs and elevate the child's knees.

Additionally, by positioning the child closer to the wearer less pressure may be generated on the wearer's torso or hips (e.g., by the bottom surface or edge of the hip seat) and the comfort of the wearer increased. To further increase the comfort of a wearer, the front edge of the seating surface of the seating platform may be extended and radiused. Similarly, then, a wearer engagement surface of the hip seat including the front edge of the seating platform may have an increased area and be radiused to accommodate the body of the wearer.

In particular then, embodiments of a hip seat system with a contoured bucket shaped seating platform may support the child in an ergonomic spread squat position ("M" position) with the child's pelvis, bottom and thighs all being supported. The child's weight can be supported rather than the child sitting with the child's weight primarily on the sacrum. The child can be supported with the knees level with, or higher than the bottom, in some cases higher than 90 degrees. The bucketed seating surface may be wider than the child's hips thus supporting the child's bottom. The outer edge of the seating surface may pass under and around the child's thighs at a distance from the child's hips where the portions of the outer edge that pass under and around the child's thighs serves to lift the child's knees.

In the ergonomic spread squat position (also known as the "frog leg", "frog", "squat spread", or "M" position) the flexion at the hip joint is at least 90° and in some cases is 110° to 120° from the coronal plane, and the spreading angle can average at approximately 45-55° from the median plane. The angle of the hips and spread can depend on the form factor of the hip seat and developmental stage of the child. In one embodiment, the hip seat can be adapted to support the child in a position with the child's femur approximately 90° to 110° (or other elevated position) from the coronal plane and to position with the child's knees with an amount of spreading. The amount of spreading may depend on the developmental stage of the child and orientation with a newborn having less than 30°, then approximately 30°, then approximately 35°-40° and so on, such that the final spread is approximately 40°-45°, though other amounts of spreading may be achieved including (e.g., for example approximately 55°). In one embodiment, the spreading may be at least 20° degrees from the median plane. The child's weight can be distributed across the child's bottom, thighs and back so that the sacrum does not bear too much weight and the child can rest with a more naturally curved "C" spine in a spread squat position ("M" position) that is believed to be better for pelvic development. In some cases, the knees are not spread. It can be noted, however, that the child can be positioned in any comfortable position, preferably emphasizing a supportive posture rather than a posture where the child is primarily sitting on his or her sacrum.

Embodiments disclosed herein include a hip seat device having a seating platform and a wearer engagement surface. The seating platform may have a bucket shape wherein the bucket shape comprises a contour perpendicular to a central axis of the seating platform that slopes generally downward away from the outer edge toward the central axis of the seating platform. This contour may have a slope of between 5 and 35 degrees. The wearer engagement surface may be connected to the seating platform and may be configured to rest against the body of a wearer. In some embodiments, the angle between the seating platform and the wearer engagement surface may be between 90 and 180 degrees. The seating platform and wearer engagement surface may be formed from a single piece and may comprise a foam material.

In some embodiments, the bucket shape may further comprise a contour that slopes generally down from an outer edge to the wearer engagement surface along the central axis. This contour may have a slope between 5 and 35 degrees. In some embodiments, the seating platform and wearer engagement surface may comprise a single piece and may be made of a foam material.

The hip seat device may be a hip seat insert that may be used in a hip seat carrier for carrying a child. For example, a hip seat device may be inserted into a hip seat pocket of a hip seat carrier. The hip seat carrier may include a waist belt for encircling a wearer having a receiving fastener and engaging fastener for installing and removing the hip seat carrier. The waist belt may be padded or otherwise cushioned to increase the comfort of the wearer.

In some embodiments, a hip seat carrier system comprises a hip seat carrier having a hip seat device and a carrier torso support portion configured for coupling to the hip seat carrier. The carrier torso support portion may include shoulder straps and provide additional support for carrying a child.

Hip seat devices and systems in accordance with embodiments provide unique contoured seating platforms that promote proper pediatric ossification/osteogenesis.

A padded, wide seat ensures that the child's weight is substantially evenly distributed and provides added comfort for the wearer. A wide, angled, and contoured bucket seat provides thigh support for carried children to elevate their knees to hip level or higher. These disclosed features, taken individually and in combination, all operate to promote the carried child assuming a "spread-squat" position ("M" position) for proper pediatric ossification/osteogenesis while providing comfort for the wearer.

BRIEF DESCRIPTION OF DRAWINGS

The drawings accompanying and forming part of this specification are included to illustrate certain aspects of the disclosure. A clearer impression of embodiments, and of various components and operation of devices and systems provided with embodiments, will become more apparent by referring to specific embodiments shown, for example, in the drawings, where identical reference numerals indicate the same components throughout. Note that features illustrated in the drawings are not necessarily drawn to scale.

FIG. 5A shows a view of one embodiment of a hip seat.

FIG. 5B shows a view of one embodiment of a hip seat with dimension specifications FIG. 5C shows a side cross-section view of one embodiment of a hip seat with dimension specifications.

DESCRIPTION

Figure 1:
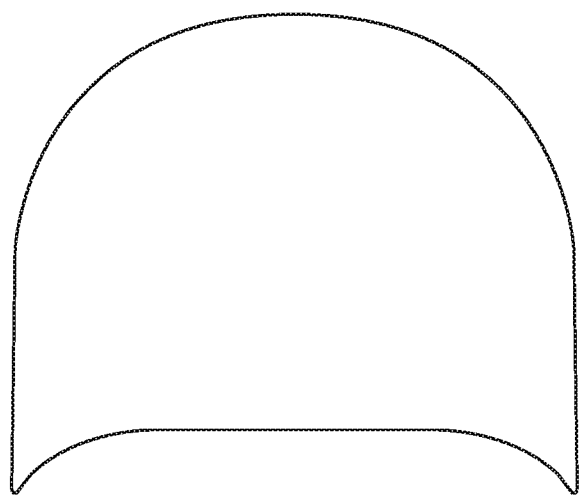
FIG. 1 shows a view of a typical conventional child-carrying seat platform.
Figure 2:
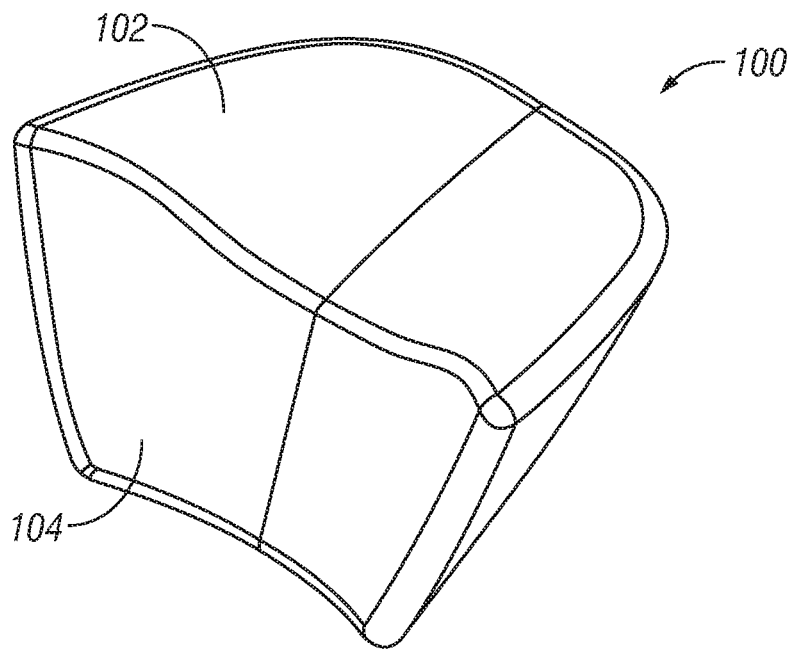
FIG. 2 shows a view of one embodiment of a hip seat.

The disclosure and various features and advantageous details thereof are explained more fully with reference to the exemplary, and therefore non-limiting, embodiments illustrated in the accompanying drawings and detailed in the following description. Descriptions of known starting materials and processes may be omitted so as not to unnecessarily obscure the disclosure in detail. It should be understood, however, that the detailed description and the specific examples, while indicating preferred exemplary embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other contextual variant thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B are true (or present).

As used herein, the terms "seat," "seating," "platform," and/or any contextual variant thereof, when describing a surface, generally refer to a surface intended for a child to sit on. As used herein, the terms "hip," "waist" and/or any contextual variant thereof, when describing a surface, generally refer to a surface intended for resting on or otherwise engaging with the waist or hip of a wearer (e.g., a parent or adult carrying a child).

As used herein, the terms "fastener," "fastening," and/or any contextual equivalents or variants thereof, may refer to any type of securing mechanism, such as, for example: buttons, snaps, d-rings, clips, hooks, patches of hook and loop material, and/or any other securing mechanism, whether now known or hereafter described in the art.

Any examples or illustrations given herein are not to be regarded in any way as restrictions on, limits to, or express definitions of, any term or terms with which they are utilized. Instead these examples or illustrations are to be regarded as being described with respect to a particular embodiment and as illustrative only. Those of ordinary skill in the art will appreciate that any term or terms with which these examples or illustrations are utilized may encompass other embodiments, as well as implementations and/or adaptations thereof which may or may not be given therewith or elsewhere in the specification, and all such embodiments are intended to be included within the scope of the disclosure. Language designating such non-limiting examples and illustrations includes, but is not limited to: "for example," "for instance," "e.g.," "in one embodiment," "an embodiment," and the like.

Before delving into embodiment in more detail, some contextual information may be helpful. When a child is born, they are in a state of total kyphosis (i.e., the back is rounded so as to resemble the letter 'C'); which is to say that the child's spine remains substantially bent as it was in the womb. The child's hip joint receives its final shape in the womb, but matures after birth. The cartilaginous material of the hip joint turns into bone over time.

The spine and the pelvis are connected to the hip joint by the sacro iliac joint. Movement of the spine and pelvis directly influence one another. When a child rounds his/her back, the pelvis tilts forward slightly, which makes healthy development of the hip joints possible. An infant's back is rounder than that of an older child. If the child's back is kept straight, the pelvis tilts backwards, which can have a negative influence on the development of the hip joints.

In order to promote ideal hip development, a child's hips should be strained as little as possible during the development period. This may be achieved with the child bending and spreading their legs as often as possible. In one embodiment, a contoured hip seat platform is disclosed that encourages a hip flexion angle of about 90-150 degrees above the coronal plane and about 25-65 degrees from the medial plane. In another implementation, disclosed embodiments provide an ergonomically contoured hip seat device and system that promotes a hip flexion angle of about 120 degrees above the coronal plane and about 45 degrees from the medial plane. The coronal plane is a vertical plane that partitions the body into two parts, front (ventral) and back (dorsal). The medial (or midsagittal) plane is a vertical plane that divides the body into two symmetrical halves (left and right).

If the knees are substantially at the same level as the bellybutton, and the legs are spread apart, then the child is in what is termed a "spread-squat" position. The spread-squat position is also variously termed the "frog-leg" position, the "frog" position, the "squat-spread" position, or the "M" position. As used herein, "spread-squat" represents the most frequently used term referring to the ergonomically beneficial positioning of the femur heads in the socket of the hip joint, or acetabulum. The socket of the hip joint is the ilium's articular surface. The spread-squat position affords substantially equal strain to all areas of the acetabulum, which is preferred for the development of the ossification center (i.e., the core of the bone).

Children should be carried in this position starting at birth; and indeed, if there are indications of hip dysplasia, this is even recommended by medical doctors. The spread-squat position is intended by nature for a reason and, when carrying, should be used. For example, a child will instinctively pull their legs into the spread-squat position as soon as they are lifted up.

Additional information regarding child seat carriers and ergonomic positioning may be found in U.S. patent application Ser. No. 10/937,193, filed Sep. 9, 2004, entitled "BABY CARRIER" by Frost, now U.S. Pat. No. 7,322,498; U.S. patent application Ser. No. 14/209,580, filed Mar. 13, 2014, entitled "CHILD CARRIER" by Telford et al., now U.S. Pat. No. 9,185,993; and U.S. patent application Ser. No. 12/544,093, filed Aug. 19, 2009, entitled "INFANT CARRIER" by Frost, now U.S. Pat. No. 9,220,352, which are hereby incorporated by reference.

Accordingly, a hip seat device in accordance with embodiments may provide a contoured seating platform for holding a child placed thereon. The seating platform may have a bucket shape and may promote the child to assume an ergonomically beneficial seated position. Additionally, the bucket shape may cause the child to gravitate toward a wearer, providing increased comfort for the wearer.

Referring now to FIG. 1, a conventional child carrier seat insert is depicted. Conventional hip seats are generally planar and not ergonomically configured to encourage a child seated thereon to assume a spread-squat position ("M" position). Accordingly, conventional child carrier seat inserts are generally not a good choice for promoting proper pediatric ossification/osteogenesis.

FIGS. 2, 3A, 4A and 5A show a hip seat insert 100 in accordance with one embodiment. Hip seat insert 100 is comprised of a seating platform 102 and a wearer engagement surface 104. Seating platform 102 provides an area for holding a child placed thereon. Wearer engagement surface 104 is connected to seating platform 102 and provides a surface for contacting a wearer. Wearer engagement surface 104 is held against a wearer, such as through the use of a waist belt of a hip seat carrier (see e.g., FIGS. 6 and 10B).

Seating platform 102 is contoured and ergonomically adapted to conform the position of a child seated thereon to assume a spread-squat position ("M" position). Such a spread-squat position may be, for example, advantageous and may, for instance, promote proper pediatric ossification/osteogenesis. Additionally, the contours of hip seat insert 100 may cause the child to gravitate toward the wearer, reducing the moment of the hip seat and thus increasing comfort for the wearer.

Wearer engagement surface 104 may also be contoured so as to provide a secure and comfortable fit around the wearer. Seating platform 102 and wearer engagement surface 104 are connected such that the weight of the child may be supported. In one embodiment, hip seat insert 100 may be a single piece, as shown in FIGS. 2-5. In other embodiments, hip seat insert 100 may comprise multiple pieces.

Seating platform 102 and wearer engagement surface 104 (e.g., in one embodiment, hip seat insert 100) may be made of any material or combination of materials, including, but not limited to: foam, polymer, metal, and wood.

Figure 4B:
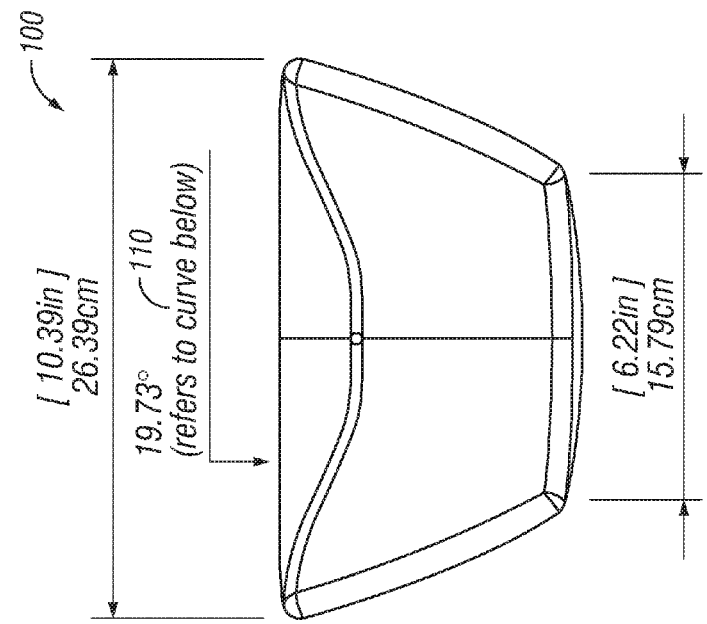
FIG. 4B shows a view of one embodiment of a hip seat with dimension specifications.

In one embodiment, seating platform 102 may have an outer edge 106 from which the seat contour diverges from, creating a bucket shape. The point of greatest depth of the seating surface may be referred to as apex 115 (as shown in FIG. 4C).

As used herein, the outer edge of the seating platform refers to the outermost edge of the seating platform distal from the wearer when worn and may be the highest portion of the seating platform, from which the seat slopes downward away from the outer edge, creating a bucket shape. The outer edge may have a cross section of any shape, including flat, rounded, pointed, etc. A flat outer edge may have any width and may provide support for the legs of a child seated thereon.

Figure 3A:
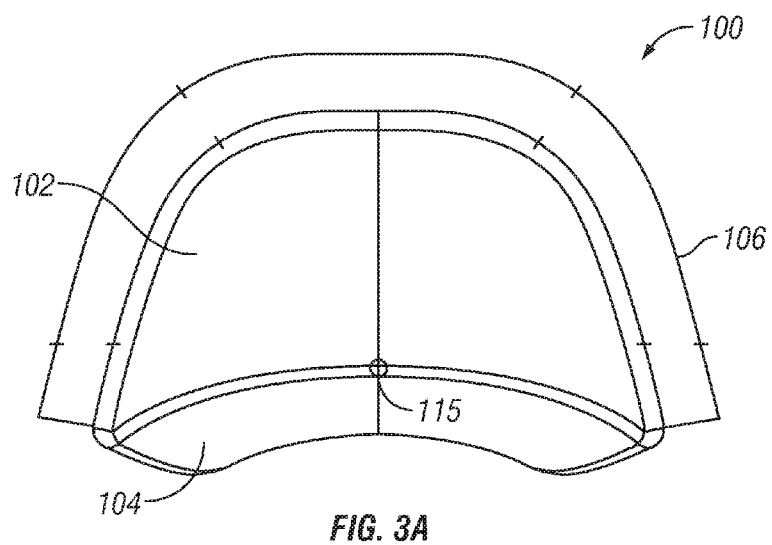
FIG. 3A shows a view of one embodiment of a hip seat.

FIG. 3A shows a top view of a hip seat insert in accordance with one embodiment. Hip seat insert 100 comprises a seating platform 102 and wearer engagement surface 104. Wearer engagement surface 104 abuts the wearer and is held onto the wearer (e.g., by a waist belt encircling the wearer). Outer edge 106 may be substantially planar, from which the contoured seating platform may diverge from to form a bucket shape.

While conventional seating platforms may have a semicircular or semi-elliptical shape (see FIG. 1), seating platform 102 in accordance with embodiments may have an outer edge that has more square shape (see FIG. 3A) which may provide more area for supporting a child's thighs in an outward-facing orientation, thus helping promote an ergonomically beneficial seated position.

Additionally, seating platform 102 may have a wearer engagement surface 104 that is wider than in conventional designs. Increased width of the wearer engagement surface may increase comfort to the wearer, such as by distributing force over a larger area, thus reducing the pressure on the wearer's torso. The seating platform may be also wider to match the width of the wearer engagement surface. Increased width of the seating platform may also provide additional thigh support for a child seated in a wearer-facing (inward-facing) orientation and help promote an ergonomically advantageous seated position.

In the embodiment shown in FIG. 3A, a more square outer edge and a wider seating platform near the wearer engagement surface together may give seating platform 102 a more trapezoidal shape compared to the semi-circular or "D" shaped seat of conventional carriers (see e.g., FIG. 1).

Figure 3B:
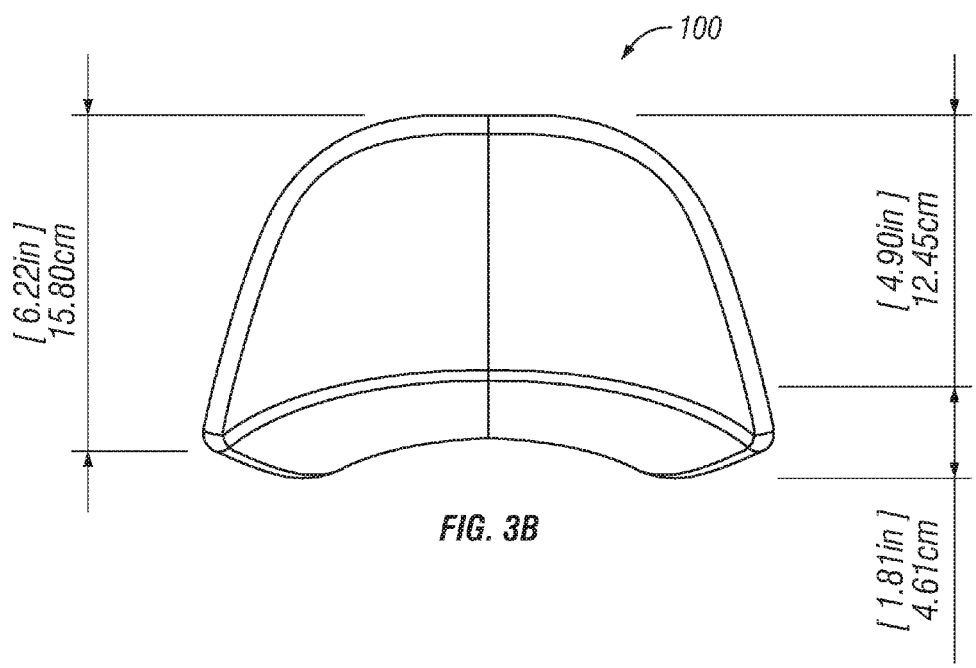
FIG. 3B shows a view of one embodiment of a hip seat with dimension specifications.

FIG. 3B shows dimensions and specifications for a hip seat insert 100 in accordance with an embodiment that includes: a seating platform maximum depth of about 15.8 cm; a seating platform minimum depth of about 12.45 cm; and a wearer engagement surface with a taper depth of about 4.61 cm. These dimensions and specifications are exemplary and may be varied or otherwise suitably adapted to achieve various other ergonomic configurations in accordance with other embodiments.

Figure 4A:
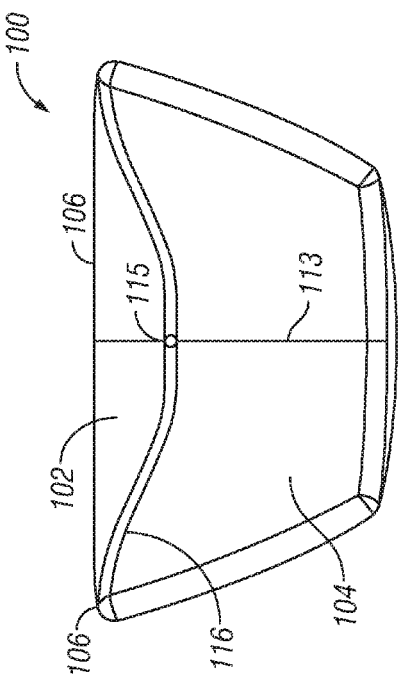
FIG. 4A shows a view of one embodiment of a hip seat.
Figure 4C:
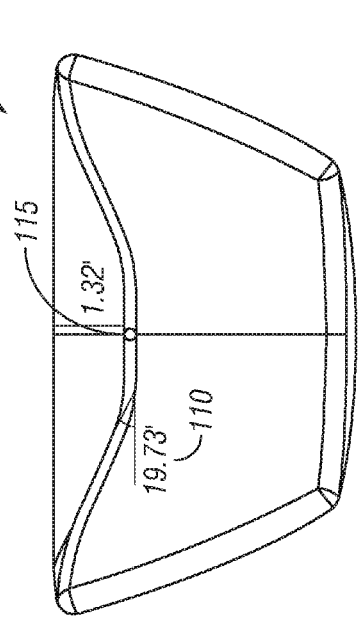
FIG. 4C shows a view of one embodiment of a hip seat with dimension specifications.

FIG. 4A shows a front view of an ergonomically contoured hip seat in accordance with one embodiment. In this view, the plane of outer edge 106 is orthogonal to the drawing, thus outer edge 106 appears as a horizontal line in this view. The front edge 116 of seating platform 102 appears below outer edge 106 and connects seating platform 102 with wearer engagement surface 104. The seating platform has a contour perpendicular to the central axis. In other words, if a cross-section is taken of the seating surface along a plane perpendicular to the central axis, the seating surface has a general slope from the central axis to the outer edge 106. The point of greatest depth may be referred to as apex 115. In one embodiment as shown in FIG. 4A, apex 115 coincides with the central axis 113 of hip seat insert 100.

In one embodiment as shown in FIG. 4A, the seating platform may have a slope that varies. Moving from left to right, the seating platform may begin substantially parallel to the plane formed by outer edge 106. The slope of the seating platform gradually increases to a maximum slope 110 (see FIG. 4C). The slope of seating platform 102 may then gradually decrease until it is roughly parallel to outer edge 106. In FIG. 4C, seating platform 102 is generally parallel to outer edge 106 at apex 115. The other side of the seating platform may be a mirror image (with respect to central axis 113) of the first side. In another embodiment, the slope of the seating platform may be constant.

A child seated in a carrier having a seating platform contour such as that shown in FIG. 4A may naturally gravitate towards central axis 113 of hip seat insert 100. Such movement may be due to gravity and/or the child seeking a comfortable seated position. In either forward or reverse facing orientations, the child's thighs may rest on the sloped portion of the contoured seating platform, pushing the child's knees up. This orientation may create a hip flexion angle greater than 90 degrees above the coronal plane, thus providing an ergonomically advantageous seated position.

FIG. 4B shows dimensions and specifications for a hip seat insert 100 in accordance with an embodiment that includes: a side-to-side seating platform width of about 26.39 cm, a surface opposing the seating platform with a width of about 15.79 cm; a seating platform contour with a maximum displacement of about 3.35 cm; and a slope of about 19.73 degrees. FIG. 4C further depicts slope 110 and depth of seat contour at apex 115 (indentation displacement) of 1.32 inches (3.35 cm). These dimensions and specifications are exemplary and may be varied or otherwise suitably adapted to achieve various other ergonomic configurations in accordance with other embodiments.

FIG. 5A shows a side view of a hip seat in accordance with one embodiment. In this view, only outer edge 106 of seating platform 102 is visible. The remainder of the seating platform and the wearer engagement surface are obscured.

FIG. 5C is a cross-section view of one embodiment of hip seat insert 100. A portion of outer edge 106 is visible in this view. In this orientation, outer edge 106 is oriented horizontally. Contour 118 defines the surface of seating platform 102 at the cross-section. The seating platform may slope generally downward from the outer edge toward the wearer engagement surface. Contour 118 may have a slope 120 at the cross-section measured by the deviation of seat contour 118 from the plane of outer edge 106. The slope of contour 118 may be constant from outer edge to the front edge or may be variable.

Hip/waist slope 130 defines an angle relative to a vertical axis with respect to FIG. 5C. When worn, wearer engagement surface 104 is held against a wearer and may be approximately vertical. Thus, when the hip seat carrier is worn empty, outer edge 106 may be inclined relative to horizontal by the magnitude of the angle of hip/waist slope 130. Seating platform 102 may thus be inclined at an even greater angle relative to horizontal, approximately equal to the sum of hip/waist slope 130 and slope 120.

In use, the actual incline of the seating platform may vary for numerous reasons. For example, wearer engagement surface 104 may not be held completely against the torso of the wearer, the wearer may not have a perfectly vertical torso where the carrier is worn, the weight of a child seated thereon may deform or rotate the hip carrier, etc. Thus, angles and dimensions are provided herein may differ in use. Such factors may be taken into account when designing hip seat insert 100.

Contour 118 may cause a child seated thereon to gravitate toward the wearer in any orientation. With the child in an outward-facing orientation, the child's thighs rest on contour 118 and may thus create a hip flexion angle greater than 90 degrees above the coronal plane. By gravitating the child toward the wearer, more of seating platform 102 may be able to support the child's thighs. In an inward facing orientation, a seat slope perpendicular to the central axis may cause the child to assume a position having a hip flexion angle greater than 90 degrees above the coronal plane. A child may remain in this position due to gravity and/or for comfort, thus helping to sustain an ergonomically advantageous seated position.

Contour 118 may also have the secondary advantage of improving comfort for the wearer of the hip seat carrier. When a child is seated on the "shelf" of a hip seat carrier, a moment is created that tends to pull the top of the carrier away from the wearer and push the bottom of the carrier into the wearer. The further the child's center of gravity is from the wearer, the greater the moment and thus the greater force applied to the wearer. Over time, the bottom of the carrier may "dig" into the wearer and cause discomfort. By causing the child to gravitate toward the wearer, the moment on the carrier is reduced, therefore reducing the reaction force that must be supplied by the wearer.

FIG. 5B is a side view of a hip seat in accordance with one embodiment, showing a contoured seating surface and other features as hidden lines. Additionally, FIG. 5B shows dimensions and specifications for a hip seat insert 100 in accordance with an embodiment that includes: an altitude between the outer edge of the seating surface and the corresponding opposing insert surface of about 14.13 cm, a front surface to opposing insert back surface displacement of about 17.02 cm (at the apex of the indicated surfaces), a wearer engagement surface (e.g., the surface intended for contact with the wearer's hip/waist) to maximum contoured well indentation (located in the seating surface) displacement of about 2.74 cm, a slope 120 of about 19.75 degrees, and hip/waist (top of wearer's hip/waist to bottom of wearer's hip/waist) slope 130 of about 17.04 degrees.

FIG. 5C further depicts slope 120 of 19.75 degrees, hip/waist slope 130 of 17.04 degrees, depth of hip/waist contour at outer apex 132 of 1.76 inches, and depth of hip/waist contour at inner apex 134 of about 1.08 inches. These dimensions and specifications are exemplary and may be varied or otherwise suitably adapted to achieve various other ergonomic configurations in accordance with other embodiments.

The disclosed dimensions, specifications and topographical features of hip seat insert 100 are selected or otherwise configured to provide a seat platform that orients, conforms, promotes or otherwise encourages a child sitting thereon to assume a spread-squat position ("M" position). While dimensions and specifications have been disclosed above, it will be appreciated that various other dimensions and specifications may be employed alternatively, conjunctively or sequentially to promote other ergonomically advantageous positions and that all such dimensions and specifications are contemplated herein.

Many variations may be possible to provide a seating platform for a child. While embodiments disclosed herein may describe the contours of a child carrier seat insert, one of ordinary skill in the art will recognize that one effect of the seat insert is to provide support for a desired shape when inserted into a pocket of a hip seat carrier. Thus, the contours of the seat insert described herein may be embodied in any manner so as to provide a seating platform for a child.

Figure 6:
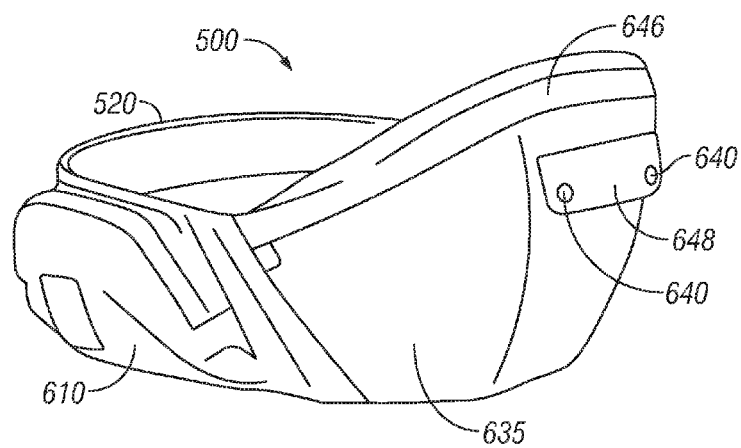
FIG. 6 shows a view of one embodiment of a hip seat system.

FIG. 6 shows a hip seat carrier 500 in accordance with one embodiment comprising a pocket 635 for receiving hip seat insert 100 thru insert pocket flap 646. Hip seat carrier 500 further comprises a waist belt 520 to encircle the hip/waist of a wearer, thus holding wearer engagement surface 104 against the wearer's torso. Hip seat carrier 500 may further comprise a utility pocket 610 for carrying supplies or other items. Upper fasteners 640 and zipper covering flap 648 may be used to conceal features for attaching a carrier torso support portion.

Figure 7:
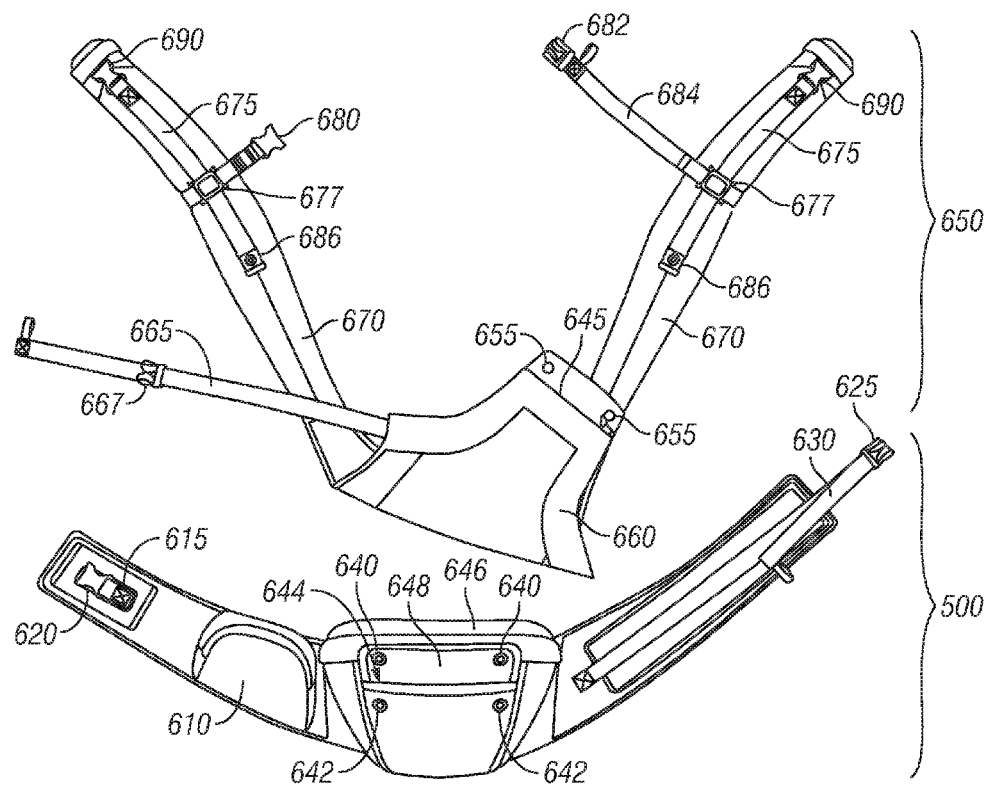
FIG. 7 shows one embodiment of a hip seat system.

FIG. 7 depicts one embodiment of hip seat carrier 500 and carrier torso support portion 650. Hip seat carrier 500 and carrier torso support portion 650 may form a hip seat carrier system, providing vertical and horizontal support for a child placed therein.

Hip seat pocket 635 may further comprise torso support zipper covering flap 648 with upper fasteners 640 (e.g., press-fit snaps, as depicted) and lower fasteners 642 (e.g., press-fit snaps, as depicted). Any type of fastener, whether now known or otherwise hereafter described in the art, may be alternatively, conjunctively or sequentially used as fastening means in place of or in addition to fasteners 640, 642. When hip seat carrier 500 is not engaged with torso support portion 650, upper fasteners 640 and lower fasteners 642 may be engaged upper-to-low or lower-to-upper so as to close zipper covering flap 648 to cover, protect or otherwise obscure hip/waist belt portion zipper 644.

Hip seat carrier 500 may further comprise: receiving fastener anchor 615 (e.g., a stitched patch, as depicted), receiving fastener 620, adjustable belt 630 (varying the circumvention diameter of hip seat carrier 500 for customizing the fit to the wearer), and engaging fastener 625 (e.g., a clip buckle, as depicted).

In one embodiment, torso support portion 650 further comprises torso support flap 660 for (when engaged with hip seat carrier 500) creating an area for receiving and supporting a child's torso within the region interiorly disposed between torso support flap 660 and the body of the wearer (e.g., parent, nanny, babysitter, or adult carrying the child). Torso support flap 660 may comprise a zipper 645 for engagement with hip/waist belt portion zipper 644. It will be appreciated that zippers 644 and 645 comprise fastening means, and as such, may alternatively, conjunctively or sequentially employ any type of securing mechanism, such as, for example: buttons, snaps, d-rings, clips, hooks, patches of hook and loop material, or any other securing mechanism, whether now known or hereafter described in the art. Hip seat carrier 500 may be engaged with torso support portion 650 when zippers (or other suitably adapted fastening means) 644 and 645 are engaged with one another.

As generally depicted in FIG. 7, for example, torso support flap press-fit snaps 655 (or other suitably adapted fastening means) may be engaged with hip/waist belt portion press-fit snaps 642 or 640 (or other suitably adapted fastening means) for mechanical attachment of hip seat carrier 500 with torso support portion 650. Alternatively, conjunctively or sequentially, torso support portion 650 and/or hip seat carrier 500 may further comprise features to cover, protect or otherwise obscure fastening means for attaching hip seat carrier 500 to torso support portion 650.

In some embodiments, torso support portion 650 further comprises wearer shoulder straps 670. Shoulder straps 670 may be padded or otherwise ergonomically adapted or otherwise configured for the comfort of the wearer. Shoulder straps 670 may further comprise: shoulder strap fastening means 690 for attachment to lower torso support straps 665, back strap 684, variable back strap webbing runners 675, webbing runner travelers 677, back strap receiving fastener 680, back strap engaging fastener 682, and back strap webbing runner fasteners 686. In operation, webbing runner traveler 677 may be suitably configured for wearer-selected longitudinal displacement along the length of back strap webbing runner 675 so as to alter the relative vertical displacement of back strap 684 along the length of the wearer's back. Lower torso support strap 665 may further comprise fastener(s) 667 for engagement with shoulder strap fastening means 690 to secure torso support portion 650 to the body of the wearer.

Figure 8:
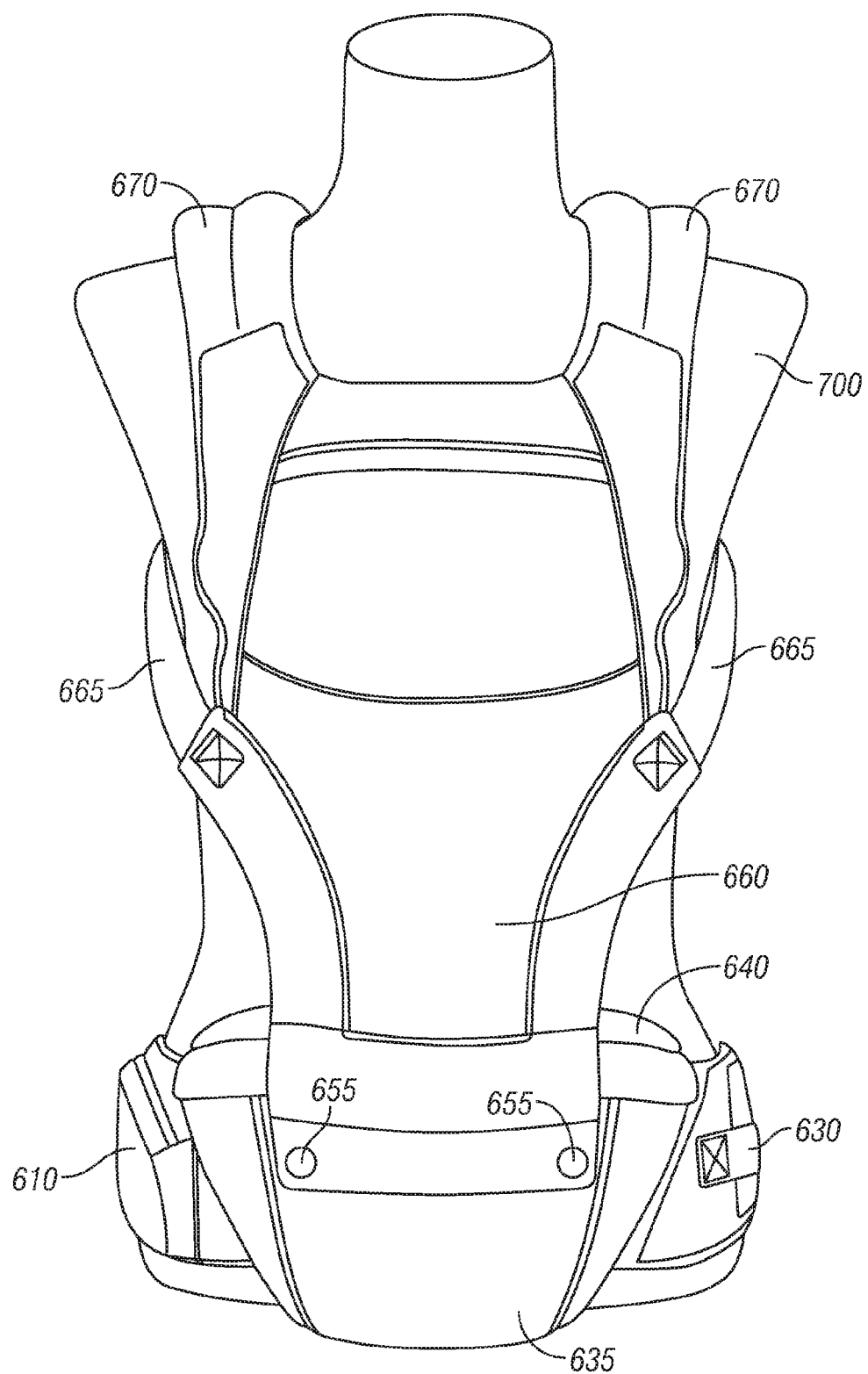
FIG. 8 shows the embodiment of the hip seat system of FIG. 7 worn on the body of a wearer.

FIG. 8 shows a configuration in accordance with one embodiment where hip seat carrier 500 has been engaged with torso support portion 650 on the body of a wearer 700. Hip seat 500 is secured around the torso of wearer 700 with hip seat pocket 635 in front of wearer 700. Utility pocket 610 and adjustable belt 630 can be seen on the wearer's right and left hips, respectively. Torso support press-fit snaps 655 of torso support portion 650 are engaged with lower fasteners 642 (not shown) of hip seat carrier 500. Torso support flap zipper 645 and hip/waist belt portion zipper 644 (not shown) may also be engaged, thereby holding the lower portion of torso support flap 660 onto hip seat carrier 500. Wearer shoulder straps 670 and lower torso support straps 665 hold the upper portion of torso support flap 660 (see FIG. 9).

Figure 9:
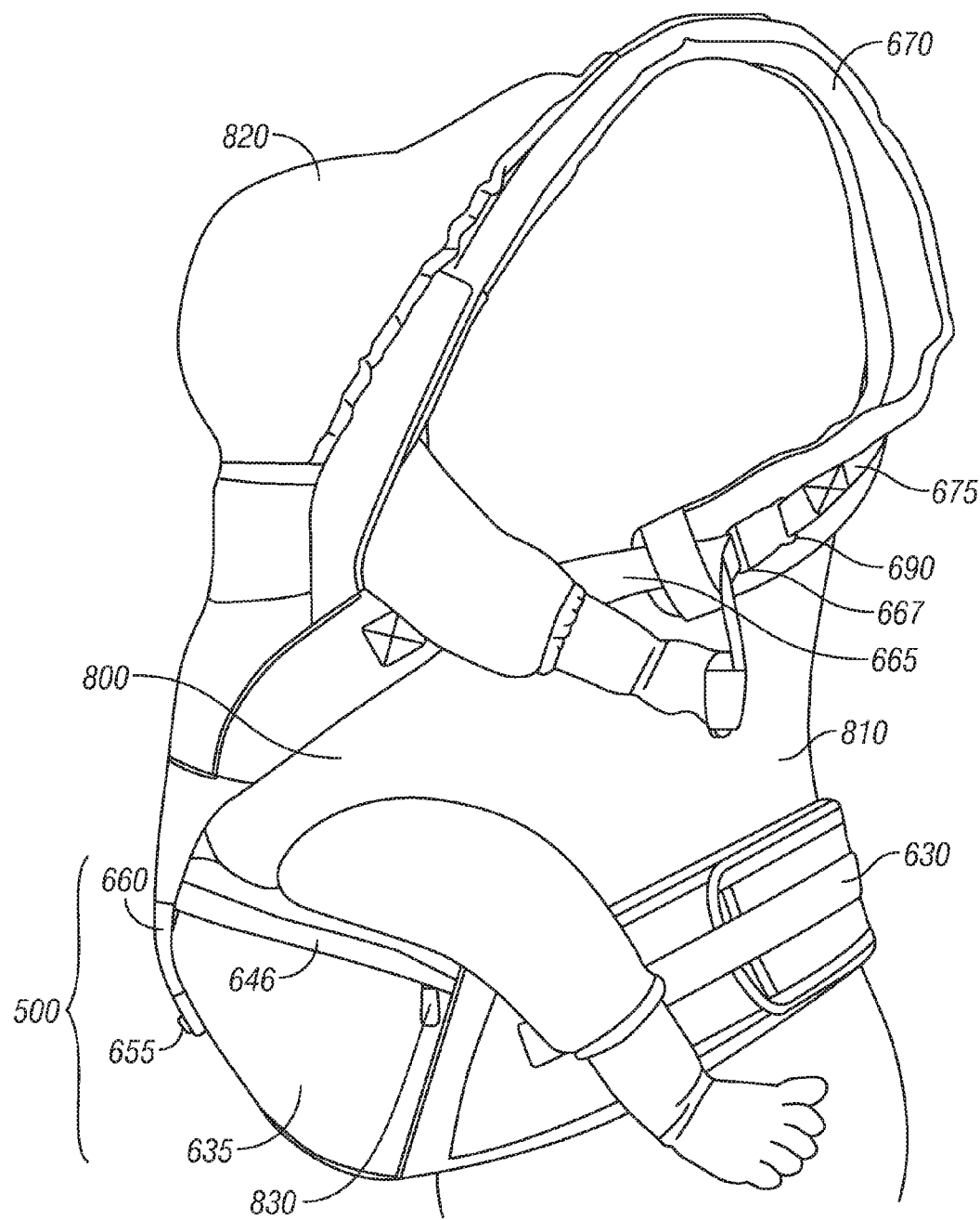
FIG. 9 shows the embodiment of the hip seat system of FIG. 8 with a carried child.

FIG. 9 shows another embodiment where hip seat carrier 500 has been engaged with torso support portion 650 on the body of a wearer 810 to carry a child 800. In FIG. 9, hip seat carrier is placed in front of wearer 810, thus the left side of wearer 810 is visible. FIG. 9 further depicts zipper handle 830 for opening hip seat pocket 635 to insert/remove hip seat insert 100. Additionally, canopy cover 820 may be included with torso support portion 650 for covering the head of child 800.

Figures 10A, 10B:
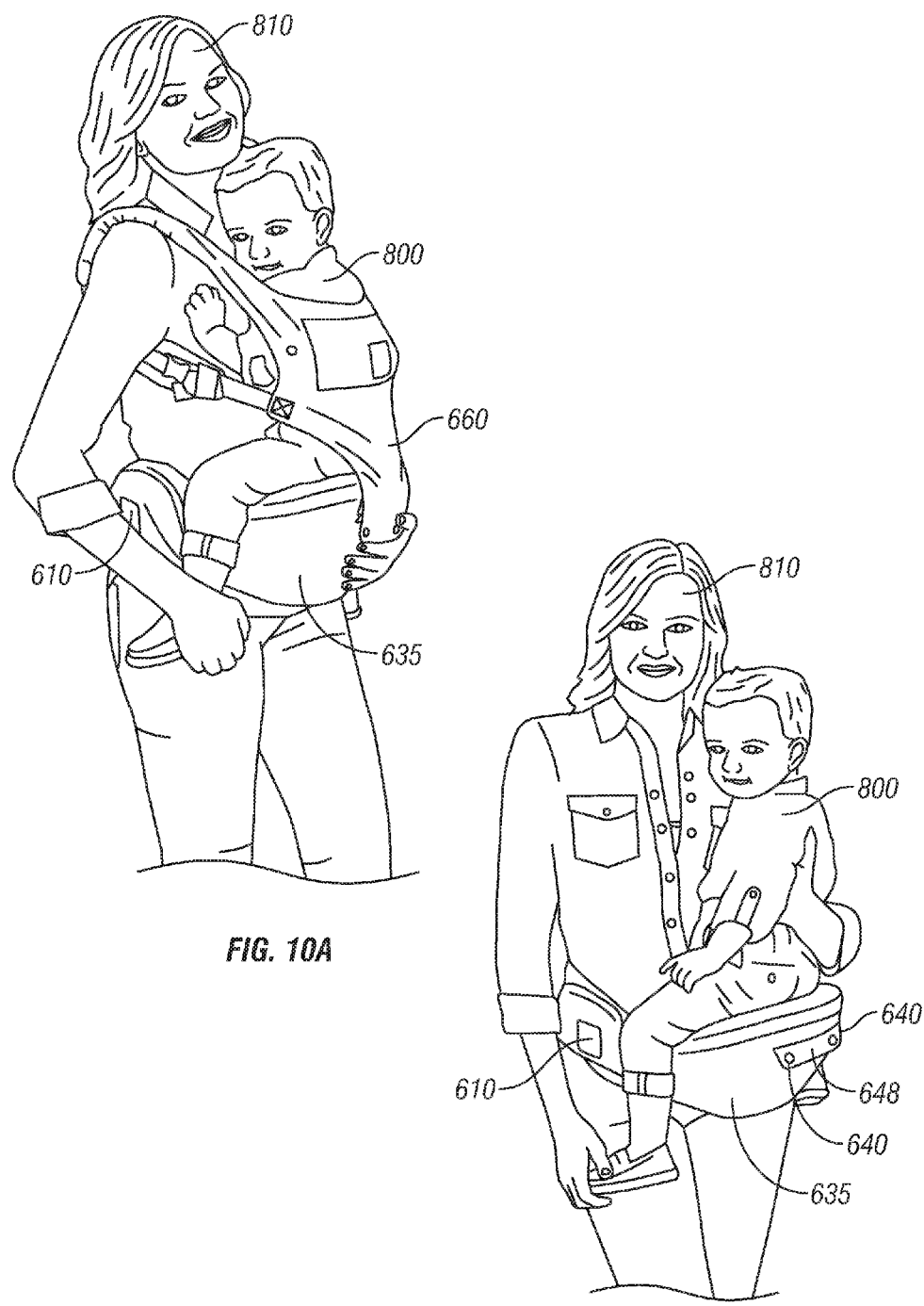
FIG. 10A shows one embodiment of a hip seat system.
FIG. 10B shows one embodiment of a hip seat system.

FIG. 10A shows a configuration where hip seat carrier 500 has been engaged with torso support portion 650 on the body of a wearer 810 to carry a child 800 in a front-inward carrying position.

FIG. 10B shows a configuration where hip seat carrier 500 is used without torso support portion 650 for a wearer 810 to carry a child 800. In FIG. 10B, hip seat carrier 500 is being worn to the left side of wearer 810. Wearer 810 may provide side-to-side and front-to-back support for child 800.

Figure 11A:
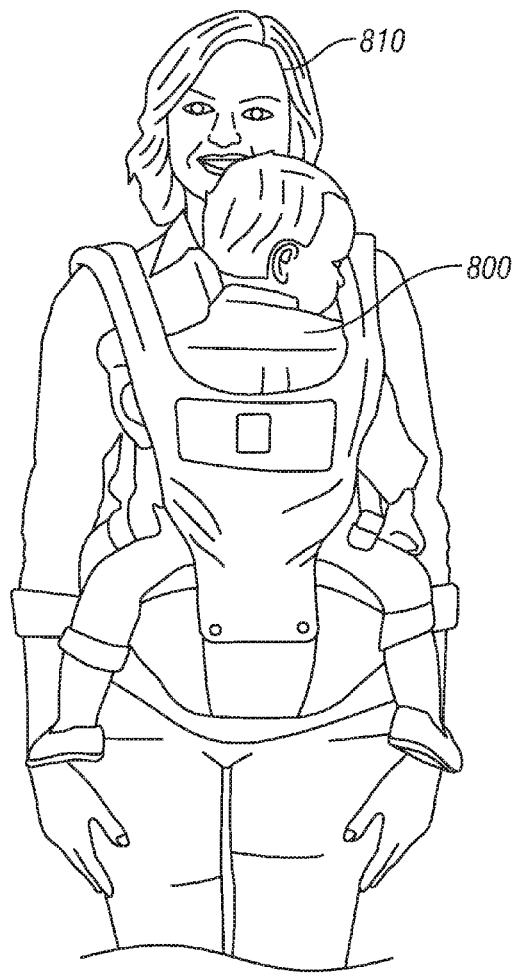
FIG. 11A shows one embodiment of a hip seat system being utilized in a front-inward carrying configuration.

FIG. 11A shows a configuration in accordance with one embodiment where the hip seat carrier 500 has been attached to the torso support portion for a wearer 810 to carry a child 800 in a front-inward carrying position.

Figure 11B:
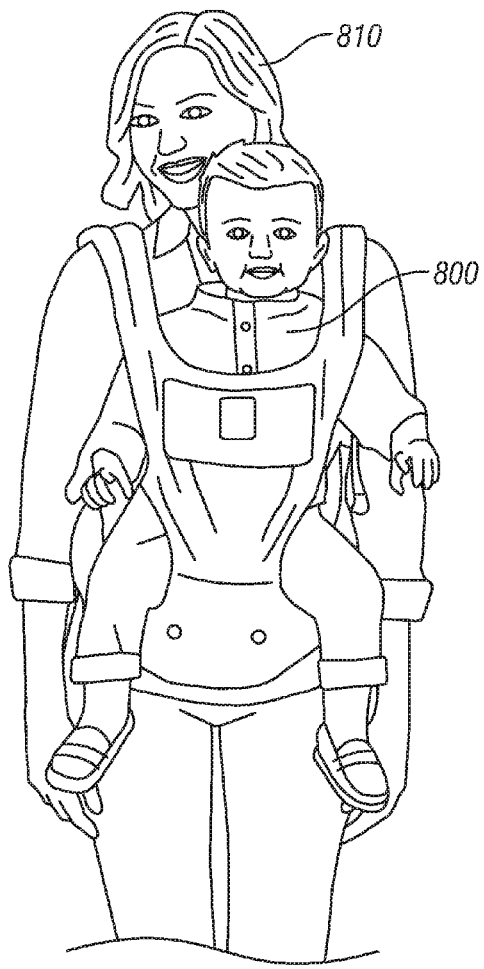
FIG. 11B shows one embodiment of a hip seat system being utilized in a front-outward carrying configuration.

FIG. 11B shows a configuration in accordance with one embodiment where hip seat carrier 500 has been attached to the torso support portion for a wearer 810 to carry a child 800 in a front-outward carrying position.

Figure 11C:
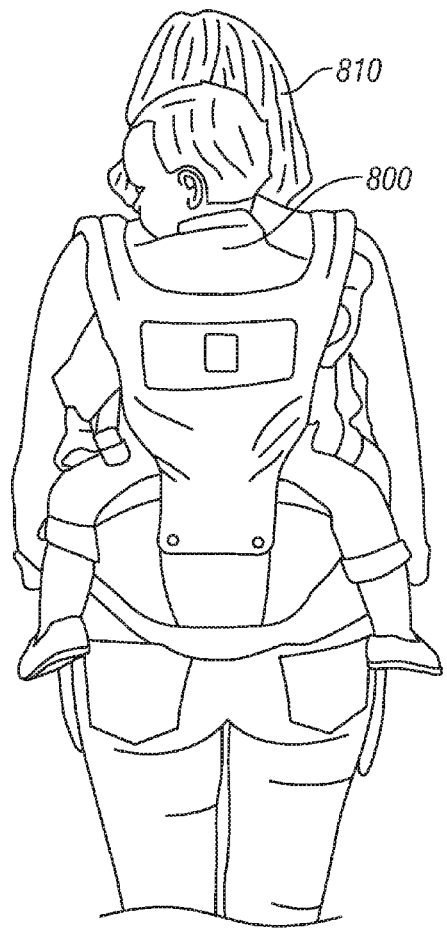
FIG. 11C shows one embodiment of a hip seat system being utilized in a back carrying configuration.

FIG. 11C shows a configuration in accordance with one embodiment where hip seat carrier 500 has been attached to the torso support portion for a wearer 810 to carry a child 800 in a back carrying position.

Figure 11D:
FIG. 11D shows one embodiment of a hip seat being utilized in a standalone configuration.

FIG. 11D shows a configuration in accordance with one embodiment where hip seat carrier 500 is used without the torso support portion for a wearer 810 to carry a child 800 in a hip-seat-only carrying position.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of a hip seat device and system. It is to be understood that the forms of disclosure herein shown and described are to be taken as embodiments. Equivalent elements or materials may be substituted for those illustrated and described herein. Moreover, certain features of the disclosure may be utilized independently of the use of other features, all as would be apparent to one skilled in the art after having the benefit of this description of the disclosure.

What is claimed is:

1. A hip seat, comprising:
a seating platform having a bucket shape, wherein the bucket shape comprises a contour perpendicular to a central axis of the seating platform that slopes generally downward away from an outer edge of the seating platform toward the central axis of the seating platform, the outer edge of the seating platform having multiple radii relative to the central axis of the seating platform, the contour further comprising an area for holding a child placed thereon, the area for holding the child thereon including a region around an apex of the seating platform and substantially parallel to the outer edge of the seating platform, the contour providing a hip flexion angle greater than 90 degrees above the coronal plane in both inward and outward facing orientations.

2. The hip seat of claim 1, wherein the bucket shape further comprises a contour that slopes generally downward away from an outer edge of the seating platform along the central axis of the seating platform.

3. The hip seat of claim 2, wherein an angle between the seating platform and a wearer engagement surface is between 90 and 180 degrees.

4. The hip seat of claim 2, wherein the contour perpendicular to the central axis of the seating platform has a slope between 5 and 35 degrees.

5. The hip seat of claim 2, wherein the contour perpendicular to the central axis of the seating platform has a slope between 15 and 25 degrees.

6. The hip seat of claim 2, wherein the contour that slopes generally downward away from the outer edge of the seating platform along the central axis of the seating platform has a slope between 5 and 35 degrees.

7. The hip seat of claim 2, wherein the contour that slopes generally downward away from the outer edge of the seating platform along the central axis of the seating platform has a slope between 15 and 25 degrees.

8. The hip seat of claim 2, wherein the seating platform comprises a foam material.

9. The hip seat of claim 2, further comprising:
a wearer engagement surface, wherein the seating platform and the wearer engagement surface are formed from a single piece.

10. The hip seat of claim 1, the contour further comprising a varying slope that, moving inward from the outer edge to the apex, increases over a first portion and decreases over a second portion.

11. A hip seat carrier system, comprising:
a hip seat carrier, comprising:
a seating platform having a bucket shape, wherein the bucket shape comprises a contour perpendicular to a central axis of the seating platform that slopes generally downward away from an outer edge of the seating platform toward the central axis of the seating platform, the outer edge of the seating platform having multiple radii relative to the central axis of the seating platform, the contour further comprising an area for holding a child placed thereon, the area for holding the child thereon including a region around an apex of the seating platform and substantially parallel to the outer edge of the seating platform, the contour providing a hip flexion angle greater than 90 degrees above the coronal plane in both inward and outward facing orientations, and a waist belt for encircling a wearer having a receiving fastener and an engaging fastener for installing and removing the hip seat carrier; and a carrier torso support portion connected to the hip seat carrier.

12. The hip seat carrier system of claim 11, wherein the bucket shape further comprises a contour that slopes generally downward away from an outer edge of the seating platform along the central axis of the seating platform.

13. The hip seat carrier system of claim 12, wherein an angle between the seating platform and a wearer engagement surface is between 90 and 180 degrees.

14. The hip seat carrier system of claim 12, wherein the contour perpendicular to the central axis of the seating platform has a slope between 5 and 35 degrees.

15. The hip seat carrier system of claim 12, wherein the contour perpendicular to the central axis of the seating platform has a slope between 15 and 25 degrees.

16. The hip seat carrier system of claim 12, wherein the contour that slopes generally downward away from the outer edge of the seating platform along the central axis of the seating platform has a slope between 5 and 35 degrees.

17. The hip seat carrier system of claim 12, wherein the contour that slopes generally downward away from the outer edge of the seating platform along the central axis of the seating platform has a slope between 15 and 25 degrees.

18. The hip seat carrier system of claim 12, wherein the seating platform comprises a foam material.

19. The hip seat carrier system of claim 12, further comprising:

a wearer engagement surface, wherein the seating platform and the wearer engagement surface are formed from a single piece.

20. A hip seat carrier, comprising:

a seating platform having a bucket shape, wherein the bucket shape comprises a contour perpendicular to a central axis of the seating platform that slopes generally downward away from an outer edge of the seating platform toward the central axis of the seating platform and a contour that slopes generally downward away from an outer edge of the seating platform along the central axis of the seating platform, the outer edge of the seating platform having multiple radii relative to the central axis of the seating platform the contour further comprising an area for holding a child placed thereon, the area for holding the child thereon including a region around an apex of the seating platform and substantially parallel to the outer edge of the seating platform, the contour providing a hip flexion angle greater than 90 degrees above the coronal plane in both inward and outward facing directions, wherein the contour perpendicular to the central axis of the seating platform has a slope between 5 and 35 degrees, wherein the contour that slopes generally downward away from the outer edge of the seating platform along the central axis of the seating platform has a slope between 5 and 35 degrees;

a hip seat pocket for receiving the seating platform; and a waist belt for encircling a wearer having a receiving fastener and an engaging fastener for installing and removing the hip seat carrier, wherein the waist belt is padded or cushioned.

21. The hip seat carrier of claim 20, wherein the seating platform comprises a foam material.

* * * * *